United States Patent
Shishime et al.

(10) Patent No.: US 10,871,112 B2
(45) Date of Patent: Dec. 22, 2020

(54) METHOD FOR PREDICTING KNOCK, METHOD FOR SUPPRESSING KNOCK, AND ENGINE SYSTEM

(71) Applicant: Mazda Motor Corporation, Hiroshima (JP)

(72) Inventors: Kouji Shishime, Hiroshima (JP); Takashi Kohata, Hatsukaichi (JP); Yuichiro Tsumura, Hiroshima (JP); Daisuke Tanaka, Hiroshima (JP); Taiki Maiguma, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/253,795

(22) Filed: Jan. 22, 2019

(65) Prior Publication Data
US 2019/0226411 A1    Jul. 25, 2019

(30) Foreign Application Priority Data

Jan. 22, 2018    (JP) ................. 2018-007852

(51) Int. Cl.
*F02D 35/02*    (2006.01)
*F02D 41/22*    (2006.01)
(Continued)

(52) U.S. Cl.
CPC ......... *F02D 35/027* (2013.01); *F02D 33/006* (2013.01); *F02D 35/023* (2013.01);
(Continued)

(58) Field of Classification Search
CPC ... F02D 35/024; F02D 35/023; F02D 41/1412
See application file for complete search history.

(56) References Cited

U.S. PATENT DOCUMENTS 5,093,792 A * 3/1992 Taki .............. F02D 35/023
                                                701/111
8,739,751 B2 * 6/2014 Stoffels ............ F02D 23/00
                                                123/179.4
(Continued)

FOREIGN PATENT DOCUMENTS

JP    2002-174135 A    6/2002
JP    2004-28022 A    1/2004
(Continued)

OTHER PUBLICATIONS

Extended Search Report issued in European Application 19152313.3-1007 dated Jun. 21, 2019.

*Primary Examiner* — Thomas N Moulis
(74) *Attorney, Agent, or Firm* — Xsensus LLP

(57) ABSTRACT

A method and system for predicting the occurrence of a knock which will have a predetermined intensity or higher (intense knock) in an engine that burns an air-fuel mixture of gasoline fuel. The pressure in a combustion chamber is detected during an initial stage of combustion. This pressure is compared with a preset reference value to determine whether or not the cylinder inner pressure exceeds the reference value during the combustion. When the cylinder inner pressure exceeds the reference value, it is predicted that the intense knock will occur before an end of the combustion. If the intense knock is predicted, additional fuel or other material can be injected into the combustion chamber to prevent the occurrence of the intense knock.

18 Claims, 9 Drawing Sheets

(51) Int. Cl.
  *F02D 41/14*  (2006.01)
  *F02D 33/00*  (2006.01)
  *G01L 23/22*  (2006.01)
  *F02D 41/40*  (2006.01)
  *F02D 41/30*  (2006.01)

(52) U.S. Cl.
  CPC ......... *F02D 41/1495* (2013.01); *F02D 41/22* (2013.01); *F02D 41/405* (2013.01); *G01L 23/227* (2013.01); *F02D 41/3041* (2013.01); *F02D 2041/1412* (2013.01); *F02D 2200/0602* (2013.01); *F02D 2250/14* (2013.01)

(56) References Cited

U.S. PATENT DOCUMENTS

| | | | | |
|---|---|---|---|---|
| 2004/0220720 | A1* | 11/2004 | Noda | F02D 35/026 701/111 |
| 2008/0035129 | A1 | 2/2008 | Vangraefschepe et al. | |
| 2012/0029789 | A1 | 2/2012 | Mehta et al. | |
| 2014/0048041 | A1* | 2/2014 | Akazaki | F02M 57/005 123/445 |
| 2017/0342916 | A1* | 11/2017 | Jung | F02D 19/0649 |
| 2018/0119623 | A1* | 5/2018 | Jung | F02B 31/00 |
| 2018/0298870 | A1* | 10/2018 | Dane | F02P 5/1502 |
| 2019/0120177 | A1* | 4/2019 | Eckert | F02D 41/1498 |
| 2019/0145859 | A1* | 5/2019 | Chen | G01M 15/11 701/102 |
| 2019/0226421 | A1* | 7/2019 | Shishime | F02D 35/027 |
| 2019/0277217 | A1* | 9/2019 | Estefanous | F02D 13/0215 |

FOREIGN PATENT DOCUMENTS

| | | |
|---|---|---|
| JP | 2008-14275 A | 1/2008 |
| JP | 2006-291758 A | 12/2008 |
| JP | 2012-041846 A | 3/2012 |

\* cited by examiner

<FLOW OF INTENSE KNOCK PREDICTION AND SUPPRESSION>

METHOD FOR PREDICTING KNOCK, METHOD FOR SUPPRESSING KNOCK, AND ENGINE SYSTEM

CROSS REFERENCES TO RELATED APPLICATIONS

This application claims priority to Japanese Patent Application 2018-007852, filed on Jan. 22, 2018, which is incorporated herein by reference. This application is also related to co-pending U.S. application Ser. No. 16/254,200, which is entitled "Engine System and Method for Suppressing Knock," filed concurrently with the present application, which is also incorporated by reference.

BACKGROUND

Technical Field

The disclosed technique relates to a technique for predicting occurrence of an intense knock (also referred to as knocking) having a predetermined intensity or higher in an engine, and suppressing the intense knock based on the prediction.

Description of the Related Art

A knock is an abnormal noise generated during an operation of an engine, and is particularly seen as a problem in a spark-ignition engine. Knocking occurs when combustion of some of the air/fuel mixture in a cylinder does not result from propagation of the flame front ignited by the spark plug, but one or more pockets of air/fuel mixture explode outside the envelope of the normal combustion front. Occurrence of the knock affects user's comfort or reliability of the engine.

For example, Japanese Patent Laid-Open No. 2008-291758 discloses an engine including a knock sensor that detects a knock. An ECU of this engine determines whether or not a knock is occurring based on a signal detected by the knock sensor. When determining that the knock is occurring, the ECU retards an ignition timing and controls the amount of ignition retarding and a fuel reduction amount based on an engine load. Thus, when the knock occurs, the knock is suppressed while suppressing a temperature increase of an exhaust gas.

Japanese Patent Laid-Open No. 2012-41846 discloses an engine including first and second direct-injection type fuel injectors, and first and second ignition plugs corresponding to the fuel injectors, respectively. In this engine, an amount of fuel corresponding to an operating state is injected before and after compression top dead center.

Specifically, before the compression top dead center, an air-fuel ratio is set to be lean, and the fuel is injected from the first fuel injector and burned by ignition by the first ignition plug. After the compression top dead center, the air-fuel ratio is set to be rich, and additional fuel is injected from the second fuel injector and burned by ignition by the second ignition plug. Thus, occurrence of a knock is suppressed while thermal efficiency is improved to achieve a high compression ratio of the engine.

SUMMARY

In the case where an engine is operated at a high rotational speed, an intense knock with an amplitude of a pressure change of higher than 100 bars sometimes occurs, although not frequently (for example, about 0.1% of the time). Such an intense knock is likely to damage the engine over time, reducing the reliability of the engine. Also, the intense knock tends to occur in an engine with a high compression ratio, preventing improvement of fuel efficiency.

As disclosed in Japanese Patent Laid-Open No. 2008-291758, retarding the ignition timing is effective for suppressing a knock. However, this method reduces a substantial compression ratio and is disadvantageous in terms of improvement of fuel efficiency. Since the ignition timing is retarded after occurrence of the knock is detected, the inventors have determined that this method is unsuitable for suppressing a sudden intense knock that does not occur frequently.

The engine in Japanese Patent Laid-Open No. 2012-41846 needs to perform two combustions during one combustion cycle, increasing the number of components and making the engine structure and control system more complex. A combustion condition is also restricted. It is difficult to stably perform the two combustions by ignition at a high rotational speed of the engine with a short combustion time. Thus, the engine in Japanese Patent Laid-Open No. 2012-41846 is unsuitable for suppressing an intense knock.

A feature of the disclosure is to predict an occurrence of a knock. Another feature of the disclosure is to effectively suppress an intense knock and improve reliability of an engine.

One disclosed technique relates to a method for predicting occurrence of a knock with a predetermined intensity or higher in an engine that burns an air-fuel mixture formed in a combustion chamber by supplying fuel containing gasoline into the combustion chamber.

The method includes obtaining, in an initial stage of combustion of an air-fuel mixture in a combustion chamber, a pressure in the combustion chamber, comparing the pressure with a preset reference value and determining whether the pressure exceeds the reference value, and predicting a knock will occur before an end of the combustion when the pressure exceeds the reference value.

Specifically, this method is obtained by the present inventors having found that occurrence of a knock with a predetermined intensity or higher can be predicted from cylinder inner pressure in an initial stage of combustion. In this method, a series of processing steps for predicting occurrence of an intense knock is performed during one combustion period in the same combustion cycle. Thus, even a sudden intense knock that does not frequently occur can be stably and efficiently predicted.

The knock intensity determination step may be performed within a period in which a crank angle is between 15° before top dead center and 25° after the top dead center.

The intense knock tends to occur when the engine is operated in a high load and high rotation operating range. Under a combustion condition in such an operating range, an initial stage of combustion suitable for determining an intense knock is often within a period in which a crank angle is between 15° before the top dead center and 25° after the top dead center. Thus, performing the knock intensity determination step during this period allows efficient and stable prediction of an intense knock.

The knock intensity determination may be performed within a period in which a burned mass fraction (BMF) is between 5% and 20% during the combustion. The burned mass fraction is an index representing a progress of combustion, and approximately corresponds to a fraction (%) of burned fuel mass to total fuel mass.

A combustion period changes depending on the combustion condition at that time such as an ignition timing, and an optimum determination timing changes accordingly. Thus, when the determination timing is set based on the crank angle, the determination timing may be shifted from the optimum timing. On the other hand, when the determination timing is set based on the burned mass fraction, the optimum timing can be maintained even if the combustion condition changes.

Further, when the knock intensity determination is performed within the period in which the burned mass fraction is between 5% and 20%, a period for suppressing an intense knock can be ensured before a timing of occurrence of the intense knock. This can suppress the intense knock and improve reliability of the engine.

After the occurrence of an intense knock is predicted, actions can be taken to suppress the actual occurrence of the predicted intense knock. For example, after the intense knock is predicted to occur, a fluid may be injected into the combustion chamber before the end of the combustion in order to suppress the predicted knock.

The engine may include an injector that injects the fuel into the combustion chamber, and may use the fuel additionally injected from the injector as the fluid in the knock suppression step.

Then, the air-fuel mixture can be agitated using an existing injector and fuel. This can eliminate the need for complex improvement or the addition of another device, and can suppress an intense knock in a straightforward manner. Cooling action due to vaporization of the fuel is also advantageously obtained.

The injection of the fluid in the knock suppression step may be performed within a period before the burned mass fraction reaches 50% during the combustion.

In experiments conducted so far, the earliest occurrence of an intense knock was found at a timing of the burned mass fraction of 50%. Thus, injecting the fluid before that timing can suppress most of intense knocks.

A further disclosed technique relates to an engine system that implements the method for predicting a knock described above.

The engine system includes a combustion chamber including a cylinder shape, a fuel supply device that supplies fuel including gasoline into the combustion chamber, and circuitry configured to obtain, in an initial stage of combustion of an air-fuel mixture in the combustion chamber, a pressure in the combustion chamber; compare the pressure with a preset reference value and determining whether the pressure exceeds the reference value; and predict a knock will occur before an end of the combustion when the pressure exceeds the reference value.

According to this engine system, a sudden intense knock that does not frequently occur can be stably and efficiently predicted.

Similarly to the method described above, the predicting of whether an intense knock will occur may be performed within a period in which a crank angle is between 15° before top dead center and 25° after the top dead center, or within a period in which the burned mass fraction is between 5% and 20% during the combustion.

In the case where the fuel supply device includes an injector that injects the fuel into the combustion chamber, when the pressure exceeds the reference value, the injector may additionally inject the fuel before an end of combustion in order to suppress the occurrence of the intense knock.

This can eliminate the need for complex improvement or addition of a device, and effectively suppress an intense knock to improve reliability of the engine.

Similar to the method described above, the additional fuel injection by the injector may be performed within a period before the burned mass fraction reaches 50% during the combustion.

A geometric compression ratio of the engine may be 14 or more. Since an intense knock tends to occur at a high compression ratio, applying this technique to the engine having a geometric compression ratio of 14 or more is more effective.

The disclosed techniques can effectively suppress an intense knock and improve the reliability of an engine.

DETAILED DESCRIPTION OF THE EMBODIMENTS

Now, an embodiment of the present disclosure will be described in detail with reference to the drawings. However, the descriptions mentioned below are merely illustrative, and do not limit the present disclosure, application or use thereof.

<Configuration of Engine>

Figure 1:
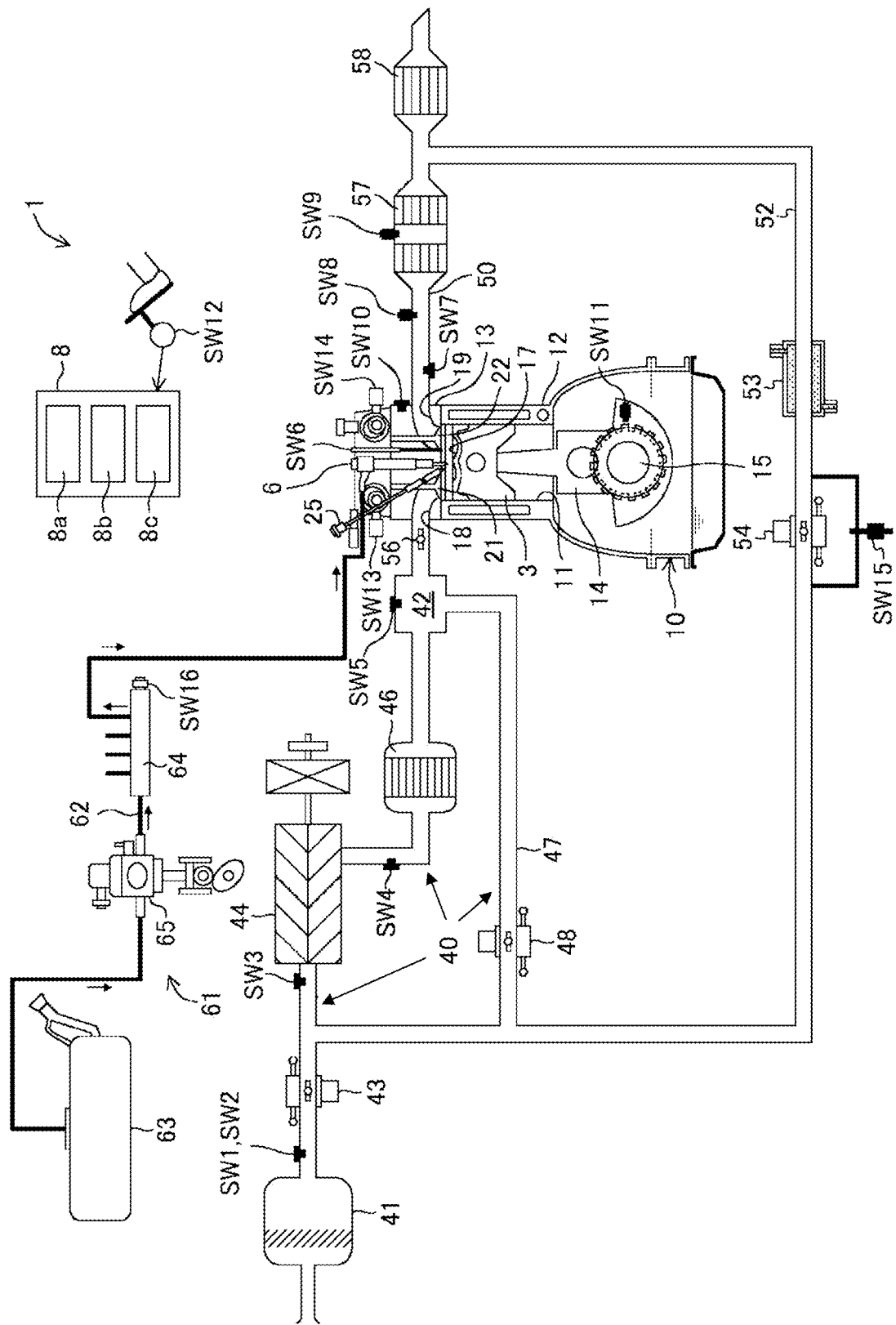
FIG. 1 is a schematic view of a configuration of an engine system according to an embodiment.

FIG. 1 shows an engine 1 to which the disclosed technique is applied. This engine 1 is mounted in an automobile. The automobile is propelled by operation of the engine 1 using fuel containing gasoline. The fuel for the engine 1 may be pure gasoline or gasoline containing bioethanol or the like. Specifically, the fuel for the engine 1 may be any fuel, according to an embodiment, as long as it is liquid fuel containing at least gasoline. However, any desired type of fuel may be used with the disclosure including both liquids and gases, such as propane.

The engine 1 performs combustion (also referred to as SPCCI ("Spark Controlled Compression Ignition") combustion) that is a combination of spark ignition (SI) combustion and compression ignition (CI) combustion. Specifically, SI combustion is started by forcedly igniting an air-fuel mixture using a spark. CI combustion is started by self-ignition of an air-fuel mixture. In SPCCI combustion, an ignited air-fuel mixture is burned by flame propagation, and heat generation and a pressure increase due to the combustion cause an unburned air-fuel mixture to be burned by self-ignition.

Adjusting an amount of heat generation by SI combustion can absorb variations in temperature before a start of compression. Thus, controlling a start timing of SI combustion according to the temperature before the start of the compression can control CI combustion. SPCCI combustion is a combustion mode in which SI combustion and CI combustion are organically controlled.

The engine 1 includes an engine body 10 including a cylinder block 12 and a cylinder head 13 placed thereon. A plurality of cylinders 11 are formed in the cylinder block (only one cylinder 11 is shown in FIG. 1). The engine body 10 further includes a piston 3, an injector 6, an ignition plug 25, an intake valve 21, an exhaust valve 22, or the like.

The piston 3 is fitted in each cylinder 11 so as to move up and down. The piston 3 is coupled to a crank shaft 15 via a connecting rod 14. The piston 3 together with the cylinder block 12 and the cylinder head 13 defines a combustion chamber 17 having a varying volume. The "combustion chamber 17" refers to a combustion space formed in the engine body 10 irrespective of a position of the piston 3.

A top surface of the combustion chamber 17 has a so-called pentroof shape resulting from a cylinder head having a "V" shape, although other types of cylinder heads are possible. A bottom surface of the combustion chamber 17, that is, an upper surface of the piston 3, has a cavity (recess). The cavity faces the injector 6 when the piston 3 is located near compression top dead center. The shape of the combustion chamber 17 may be changed according to specifications of the engine 1. For example, shapes of the cavity, the upper surface of the piston 3, and the top surface of the combustion chamber 17 may be changed as appropriate.

A geometric compression ratio of the engine 1 is set to 14 to 30 (both inclusive), preferably 14 to 18 (both inclusive). In SPCCI combustion, the CI combustion is controlled using heat generation and a pressure increase caused by SI combustion. Thus, in the engine 1, there is no need to increase a temperature (compression end temperature) of the combustion chamber 17 when the piston 3 reaches the compression top dead center to cause self-ignition of the air-fuel mixture.

Specifically, the geometric compression ratio of the engine 1 is higher than that of a general spark ignition engine that performs only SI combustion, and lower than that when only CI combustion is performed. A high geometric compression ratio is advantageous for increasing thermal efficiency, and a low geometric compression ratio is advantageous for reducing cooling loss and mechanical loss. The geometric compression ratio of the engine 1 may be set according to fuel specifications. For example, for regular specifications (fuel octane number of about 91 RON, around 87 (R+M)/2 used in the U.S.), the geometric compression ratio may be 14 to 17 (both inclusive), and for high-octane specifications (fuel octane number of about 96 RON, around 92 (R+M/2), the geometric compression ratio may be 15 to 18.

The cylinder head 13 has two intake ports 18 communicating with the combustion chamber 17 for each cylinder 11. The intake valve 21 is provided in each intake port 18 to open/close between the combustion chamber 17 and the intake port 18. The intake valve 21 is opened/closed by a variable valve mechanism, and an opening/closing timing and/or an opening/closing amount thereof are changeable.

The cylinder head 13 also has two exhaust ports 19 communicating with the combustion chamber 17 for each cylinder 11. The exhaust valve 22 is provided in each exhaust port 19 to open/close between the combustion chamber 17 and the exhaust port 19. The exhaust valve 22 is opened/closed by a variable valve mechanism, and an opening/closing timing and/or an opening/closing amount thereof are changeable. Exemplary types of variable valve mechanisms include cam phasing and cam changing. With cam changing, a control computer selects a different cam profile based on engine load and speed, whereas with cam phasing, an actuator rotates the camshaft, changing the phase angle.

The injector 6 is provided on the cylinder head 13 for each cylinder 11. The injector 6 is configured to directly inject fuel into the combustion chamber 17 from a substantial center of the top surface of the combustion chamber 17. An injection center of the injector 6 faces the cavity. The injector 6 has a plurality of injection holes arranged at circumferentially regular intervals, and spray of the fuel injected from the injection holes radially spreads obliquely downward from an upper part of the combustion chamber 17. The injector 6 has a nozzle which is opened/closed by driving a solenoid or a piezoelectric element. Thus, opening/closing of the nozzle can respond to a control signal at high speed, and high-speed injection, for example, at 1 ms or less can be performed.

The injector 6 is part of a fuel supply device 61. The fuel supply device 61 is constituted by the injector 6, a fuel tank 63, a fuel supply passage 62, a fuel pump 65, a common rail 64, or the like. The fuel pump 65 feeds fuel accommodated in the fuel tank 63 through the fuel supply passage 62 to the common rail 64. The fuel is stored in the common rail 64 at high pressure of 30 MPa or more. The common rail 64 is connected through the fuel supply passage 62 to the injector 6, and the injector 6 is opened to inject the fuel into the combustion chamber 17 at high pressure of 30 MPa or more. In the engine 1, fuel injection pressure is set to 60 MPa, for example.

The ignition plug 25, also referred to as a spark plug, is provided on the cylinder head 13 for each cylinder 11. The ignition plug 25 forcedly ignites an air-fuel mixture formed in the combustion chamber 17. The ignition plug 25 has an electrode at its front end, and is placed so that the electrode faces the upper part of the combustion chamber 17 between the two intake ports 18, 18.

An intake passage 40 communicating with the intake port 18 in each cylinder 11 is connected to one side surface of the engine body 10. In the intake passage 40, an air cleaner or air filter 41, a surge tank 42, a throttle valve 43, a supercharger 44, an intercooler 46, or the like are provided. A gas is introduced through the intake passage 40 into the combustion chamber 17.

The throttle valve 43 changes an amount of fresh air to be introduced into the combustion chamber 17. The supercharger 44 is driven by the engine 1, and boosts a gas to be introduced into the combustion chamber 17. The supercharger 44 is controlled to switch between a state (ON) where the gas is boosted and a state (OFF) where the gas is not boosted. The intercooler 46 cools the gas compressed by the supercharger 44.

A bypass passage 47 that bypasses the supercharger 44 and the intercooler 46 is connected to the intake passage 40. In the bypass passage 47, an air bypass valve 48 that changes a gas flow rate is provided. Turning off the supercharger 44 and fully opening the air bypass valve 48 causes the gas to be introduced through the bypass passage 47 into the combustion chamber 17. In that case, the engine 1 is operated in an unboosted (naturally aspirated) state. When the engine 1 is operated in a boosted state, the supercharger 44 is turned on and the air bypass valve 48 is closed. Then, the boosted gas from the supercharger 44 can be introduced into the combustion chamber 17.

In one of the intake ports 18, a swirl control valve 56 is provided that forms a swirl flow in the combustion chamber 17 and changes an intensity of the swirl flow. When an opening of the swirl control valve 56 is small, the intensity of the swirl flow is high, and when the opening of the swirl control valve 56 is large, the intensity of the swirl flow is low. In this engine 1, to achieve particularly stable SPCCI combustion, a swirl ratio is adjusted within a range of 1.5 to 3 (25% to 40% opening of the swirl control valve 56). Swirl is used to promote rapid combustion and is used to rapidly mix fuel and air. The swirl ratio is a dimensionless parameter to quantify the rotational motion within the cylinder. A first way to define the swirl ratio is an angular speed of the swirl divided by the engine speed, and a second way to define the swirl ratio is the swirl tangential speed divided by the average piston speed.

An exhaust passage 50 communicating with the exhaust port 19 in each cylinder 11 is connected to the other side surface of the engine body 10. In the exhaust passage 50, two catalyst converters 57 and 58 are provided. The upstream catalyst converter 57 is usually placed in an engine room or engine bay, and has a three-way catalyst and a gasoline particulate filter (GPF). The downstream catalyst converter 58 is placed outside the engine room and has a three-way catalyst. Configurations of the catalyst converters 57 and 58 can be changed according to specifications of the engine 1 as appropriate.

An EGR (Exhaust Gas Recirculation) passage 52 that returns part of burned gas to the intake passage 40 is connected between the intake passage 40 and the exhaust passage 50. In the EGR passage 52, an EGR cooler 53 and an EGR valve 54 are provided. The EGR valve 54 changes a flow rate of the burned gas flowing through the EGR passage 52, and the EGR cooler 53 cools the burned gas flowing through the EGR passage 52 (external EGR system). The external EGR system supplies the burned gas at low temperature into the combustion chamber 17.

Figure 2:
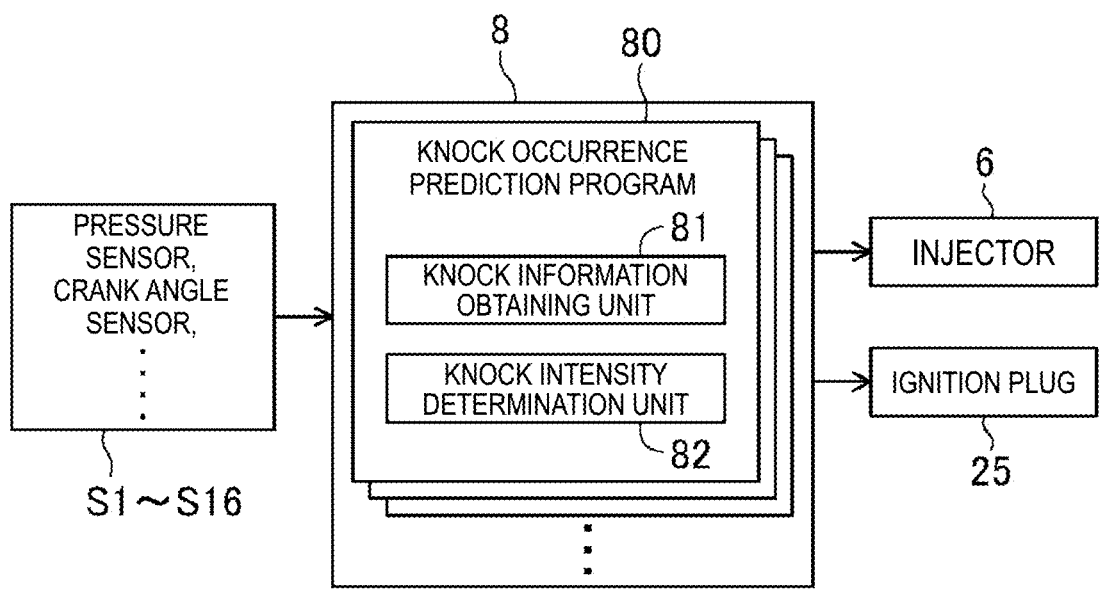
FIG. 2 is a block diagram of a configuration of a control device.

In the engine 1, a plurality of sensors SW1 to SW16 are provided. For example, an air flow sensor SW1, an intake temperature sensor SW2, a pressure sensor SW3, an intake temperature sensor SW4, a pressure sensor SW5, a pressure sensor SW6, an exhaust temperature sensor SW7, a linear oxygen sensor SW8, a lambda oxygen sensor SW9, a water temperature sensor SW10, a crank angle sensor SW11, an accelerator opening sensor SW12, an intake cam angle sensor SW13, an exhaust cam angle sensor SW14, an EGR differential pressure sensor SW15, a fuel pressure sensor SW16, or the like are provided in various parts in the engine 1. As shown in FIG. 2, the sensors SW1 to SW16 are connected to an ECU 8 (an example of a control device), and constantly output detected signals to the ECU 8 during the operation of the engine 1.

For example, the crank angle sensor SW11 is mounted to the engine 1 and detects a rotation angle of the crank shaft 15. The pressure sensor SW6 is mounted to the cylinder head 13 for each cylinder 11, detects pressure in each combustion chamber 17 (also referred to as cylinder inner pressure), and outputs a detected signal to the ECU 8. The pressure sensor SW6 can output the detected signal, for example, at an interval equal to or shorter than a time for one revolution of the crank shaft 15 at maximum rotational speed of the engine 1.

As shown in FIGS. 1 and 2, the ECU 8 is constituted by hardware including a processor 8a, a memory 8b, an interface 8c, or the like, and software including various data such as an operating range map 70 and control programs, or the like. The processor 8a may be implemented as a high-performance processor, for example, of 32 or 64 bits with an operating frequency of 100 MHz or more, and can perform high-speed advanced arithmetic processing. While one ECU 8 having one processor 8a has been illustrated, the functions performed by the ECU 8 may be implemented using multiple ECUs and/or multiple processors. Further, the functionality may be implemented using circuitry or processing circuitry which includes general purpose processors, special purpose processors, conventional circuitry and/or combinations thereof which are configured or programmed to perform the disclosed functionality. Processors are considered processing circuitry or circuitry as they include transistors and other circuitry therein.

The ECU 8 controls the devices that constitute the engine 1 (only the injector 6 and the ignition plug 25 are shown as examples in FIG. 2) to properly operate the engine 1 based on the signals output from the sensors SW1 to SW16 and the data such as the operating range map 70 described below. The ECU 8 also performs control to predict occurrence of a knock with a predetermined intensity or higher and suppress the knock based on the prediction as described later in detail.

<Operating Range Map>

Figure 3:
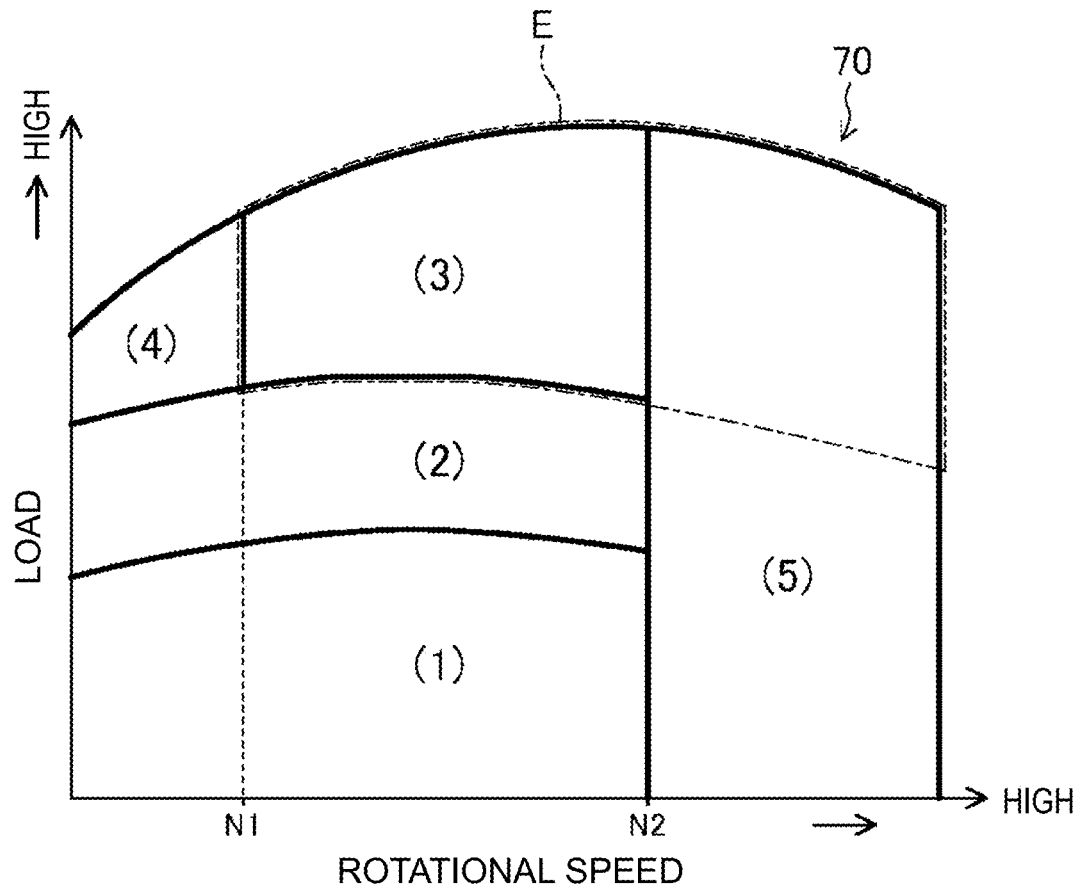
FIG. 3 shows an example of an operating range map used for controlling the engine.

FIG. 3 shows an example of the operating range map 70 used for controlling the operation of the engine 1. The operating range map 70 is used for an operation when the engine is warm or at its normal operating temperature, and includes the following five divided ranges.

(1) "Low load range" for idling and extending over the low rotational speed and medium rotational speed ranges.

(2) "Medium load range" for a higher load than the low load range and extending over the low rotational speed and medium rotational speed ranges.

(3) "High load medium rotational speed range" for a higher load than the medium load range and being a medium rotational speed range in a high load range.

(4) "High load low rotational speed range" being a low rotational speed range with a lower rotational speed than the medium rotational speed range in the high load range.

(5) "High rotational speed range" with a higher rotational speed than the previous four ranges.

The low rotational speed, medium rotational speed, and high rotational speed ranges herein refer to rotational speed ranges arranged in order from a low rotational speed side when an entire operating rotational speed range of the engine 1 is substantially divided into three. The low rotational speed refers to less than a rotational speed N1 (for example, about 1200 rpm), the high rotational speed refers to a rotational speed N2 (for example, about 4000 rpm) or more, and the medium rotational speed refers to the rotational speed N1 or more and less than N2. Further, the load ranges are divided into low, medium, and high load ranges, with the dividing portion between the load ranges being any desired percentage of a maximum load, and can vary based on the rotational speed of the engine. The operating range map 70 of FIG. 3 is one example of how the load ranges can be defined, and FIG. 3 can be considered to be to scale.

The engine 1 may perform SPCCI combustion in the entire range in the operating range map 70, but in this configuration, the engine 1 performs SPCCI combustion in the low load range (1), the medium load range (2), and the high load medium rotational speed range (3). In the other ranges, specifically, the high load low rotational speed range (4) and the high rotational speed range (5), the engine 1 performs SI combustion by spark ignition. When the temperature of the engine 1 is not sufficiently warmed or when the engine is first started, SI combustion may be performed in part or all of the low load range (1), the medium load range (2), and the high load medium rotational speed range (3).

The supercharger 44 is turned off in the low load and low rotational speed range in the low load range (1) and the medium load range (2). In these ranges, the engine 1 is operated in an unboosted state, that is, a naturally aspirated state. The supercharger 44 is turned on in the other ranges, for example, the high load medium rotational speed range (3), the high load low rotational speed range (4), and the high rotational speed range (5). In these ranges, the engine 1 is operated in a boosted state, that is, a state in which a downstream side of the supercharger 44 is dynamically subjected to higher pressure than atmospheric pressure.

(SPCCI Combustion)

The engine 1 performs SPCCI combustion in the low load range (1) or the like mainly for improving fuel consumption and exhaust gas performance. When SPCCI combustion is performed, the swirl control valve 56 is controlled to be at a predetermined opening or an opening range, and a diagonal swirl flow having a predetermined intensity is formed in the combustion chamber 17 (for example, a swirl ratio of 1.5 to 3).

An excess air ratio $\lambda$ of the air-fuel ("A/F") mixture formed in the combustion chamber 17 is controlled to be more than one in the low load range (1) (an A/F is 30 or more), substantially one (1.0 to 1.2) in the medium load range (2), and one or less in the high load range. An EGR gas is introduced into the combustion chamber 17 as required. For example, in the low load range (1), an internal EGR gas is introduced by setting of a positive or negative overlap period. In the medium load range (2) and the high load medium rotational speed range (3), an external EGR gas cooled as required is introduced. An amount of the EGR gas is controlled to decrease with increasing load.

Figure 4:
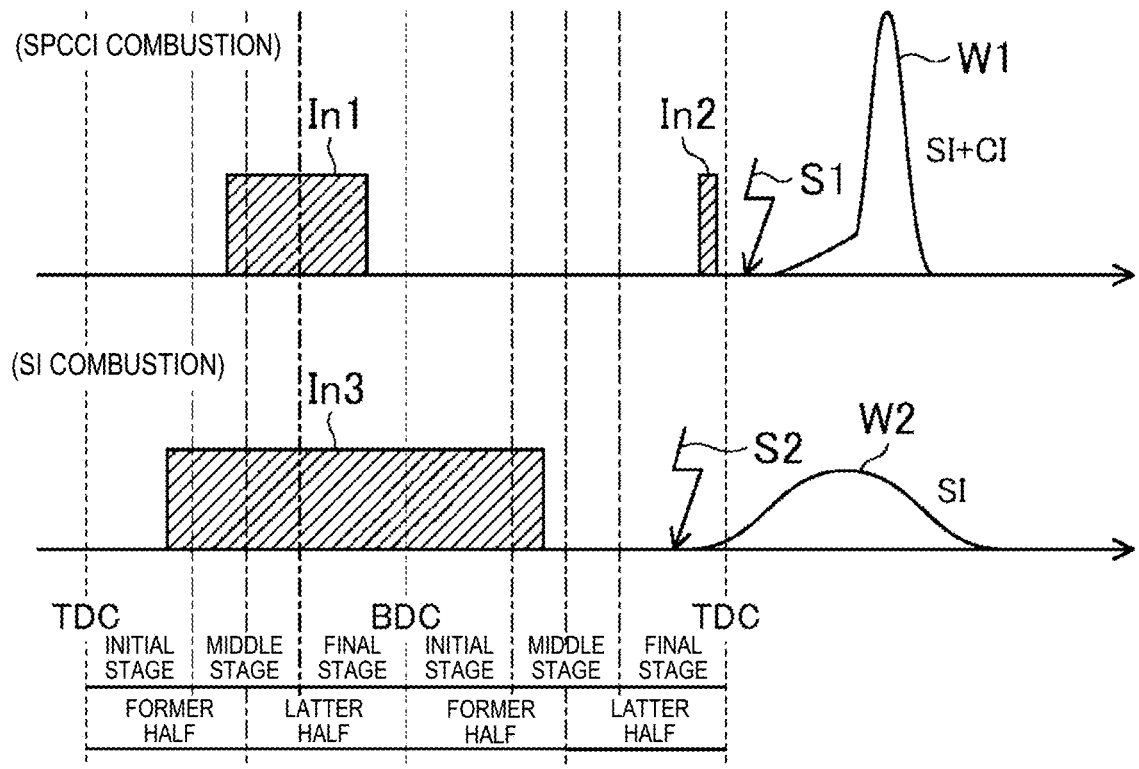
FIG. 4 illustrates a combustion state in a main operating range.

The upper part in FIG. 4 shows an example of the mode of SPCCI combustion (combustion in the high load medium rotational speed range (3)). The fuel is injected at a predetermined timing within a period from an intake stroke to a compression stroke, and as shown, injected in a divided manner (denoted by reference numerals In1, In2). The air-fuel mixture in combination with the swirl flow may be stratified (for example, an A/F of the air-fuel mixture in a center is 20 to 30 and an A/F of the air-fuel mixture in an outer peripheral portion is 35 or more). An A/F in the entire combustion chamber 17 when SPCCI combustion is performed is generally controlled to 18 to 50 (both inclusive).

The ignition plug 25 performs forced ignition at a predetermined timing around the compression top dead center (denoted by reference numeral S1). Thus, the air-fuel mixture formed in the combustion chamber 17 is subjected to SPCCI combustion. After the forced ignition by the ignition plug 25 which causes SI combustion, a combustion waveform of the CI combustion occurs, and a combined waveform of SI combustion and CI combustion as illustrated in FIG. 4 as W1 representing a change in a heat generation rate is formed.

(SI Combustion)

The engine 1 of this configuration performs SI combustion when stable SPCCI combustion is difficult such as in the high rotational speed range (5). When SI combustion is performed, the swirl control valve 56 is controlled to be at a substantially fully open position. Also, when SI combustion is performed, the external EGR gas cooled as required is introduced, and an excess air ratio $\lambda$ of the air-fuel mixture is controlled to be substantially one (1.0 to 1.2).

In the high load low rotational speed range (4), retarded injection is performed. Specifically, within a period from a latter stage of the compression stroke to an initial stage of the expansion stroke (retarded period), the injector 6 injects fuel at high pressure (for example, 30 MPa or more).

As shown in the lower part in FIG. 4, in the high rotational speed range (5), the fuel injection begins during the intake stroke and continues through a portion of the compression stroke (denoted by reference numeral In3). The ignition plug 25 performs forced ignition (denoted by reference numeral S2) at a predetermined timing around the compression top dead center. Thus, the air-fuel mixture formed in the combustion chamber 17 is burned without self-ignition, and a combustion waveform of SI combustion is formed (denoted by reference numeral W2).

<Prediction of Intense Knock>

A knock is particularly seen as a problem in a spark-ignition engine that performs SI combustion. Specifically, when combustion of an air-fuel mixture is started by ignition using an ignition plug, the combustion spreads by flame propagation. Meanwhile, an unburned air-fuel mixture (end gas) may be locally increased in temperature and pressure to cause combustion by self-ignition. Since the combustion by self-ignition is more sudden than the combustion by flame propagation, pressure vibration thereof generates a noise or an impact to cause a knock.

Generally, the knock occurs when the engine is operated at a low rotational speed in a high load operating range, and is eliminated by a rotational speed increasing to increase a flame propagation speed. However, the knock also occurs when the engine is operated at a high rotational speed. The knock that occurs when the engine is operated at a high rotational speed tends to be more intense than the knock that occurs when the engine is operated at low rotation. An intense knock with a predetermined intensity or higher may occur although not frequently (for example, about 0.1%).

In the engine 1 that performs SPCCI combustion, the geometric compression ratio is 14 or more, and pressure in the combustion chamber 17 during combustion is set to be higher than that in a typical spark ignition engine. Thus, in the engine 1, a knock is more likely to occur than in the typical spark ignition engine. As in the typical spark ignition engine, an intense knock may occur in this engine 1.

The intense knock is highly likely to damage the engine, even if the knock does not occur frequently. Thus, the intense knock reduces reliability of the engine. In this respect, the present inventors have found that occurrence of the intense knock can be predicted from cylinder inner pressure in an initial stage of combustion. Based on the findings, the engine 1 includes a technique that allows prediction of occurrence of an intense knock with high precision and suppression of the intense knock based on the prediction.

Figure 5:
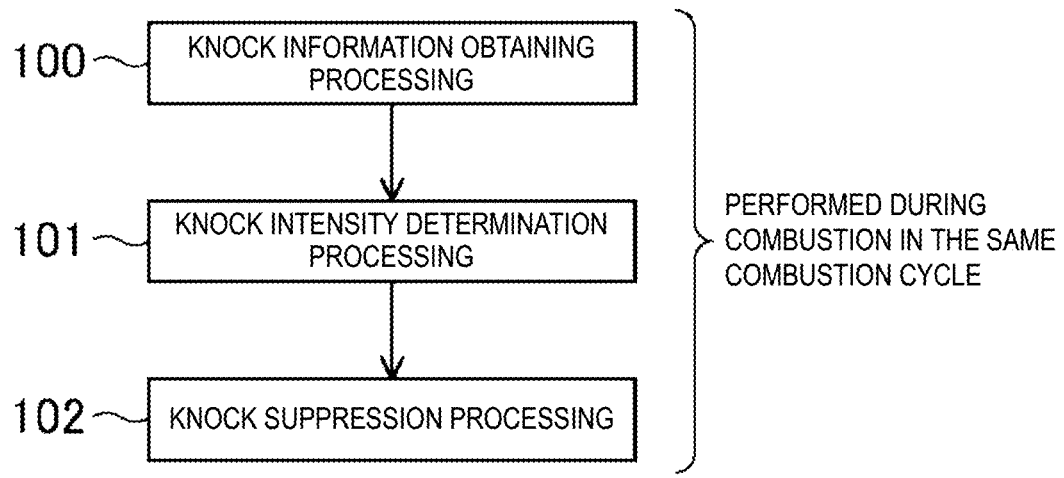
FIG. 5 is a main flowchart of intense knock prediction and suppression processing steps.

Specifically, as shown in FIG. 5, the engine 1 first performs a knock information obtaining processing 100 (knock information obtaining step) of detecting or estimating cylinder inner pressure in an initial stage of combustion after a start of the combustion, from a latter stage of the compression stroke to an initial stage of the expansion stroke; and a knock intensity determination processing 101 (knock intensity determination step) of comparing the cylinder inner pressure with a preset reference value SV and determining whether or not the cylinder inner pressure exceeds the reference value SV during the course of the combustion. When the cylinder inner pressure exceeds the reference value SV, it is predicted that the intense knock occurs before an end of the combustion.

Specifically, as shown in FIG. 2, a knock occurrence prediction program 80 for predicting an occurrence of the intense knock is installed in the ECU 8. The knock occurrence prediction program 80 includes a knock information obtaining unit 81 and a knock intensity determination unit 82. The knock information obtaining processing 100 is performed by the knock information obtaining unit 81, and the knock intensity determination processing 101 is performed by the knock intensity determination unit 82. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, elements such as knock occurrence prediction circuitry, and other circuitry, means, or units is the combination of hardware and software.

Specifically, the ECU 8 detects the cylinder inner pressure based on the detected signal constantly input from the pressure sensor SW6 during the operation of the engine 1. The knock information obtaining unit 81 obtains the cylinder inner pressure in the initial stage of combustion after the start of the combustion, from the latter stage of the compression stroke to the initial stage of the expansion stroke. The knock intensity determination unit 82 cooperates with the knock information obtaining unit 81 to predict occurrence of the intense knock. In the knock intensity determination unit 82, a reference value SV as a reference for determining the intense knock is set.

The reference value SV is a value of cylinder inner pressure at a predetermined determination timing corresponding to a predetermined knock intensity (Kp) (for example, 100 bars or the like). The reference value SV is stored in the memory 8b in the ECU 8. The reference value SV is changeable and set correspondingly to specifications of the engine 1.

The knock intensity is an index representing the intensity of a knock, and/or an amplitude value of a cylinder inner pressure pulse due to the knock. The knock intensity is obtained by an arithmetic processing of cylinder inner pressure data.

Figure 6:
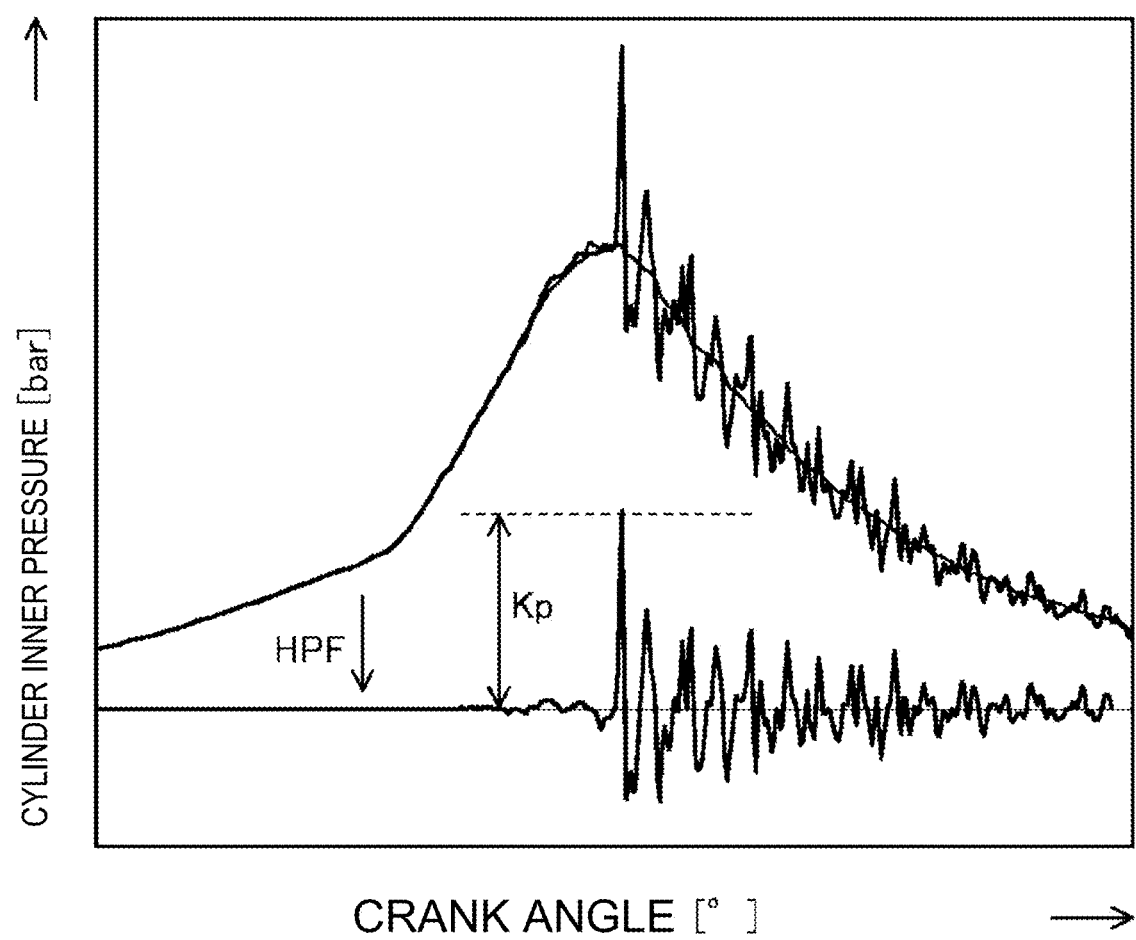
FIG. 6 illustrates a knock intensity.

With reference to FIG. 6, the knock intensity will be specifically described. A waveform shown on the upper side in FIG. 6 represents a cylinder inner pressure in a certain combustion cycle. A pulse-like waveform in a latter stage of combustion represents a knock. Such a pressure waveform of the cylinder inner pressure is processed using a high-pass filter (HPF) or the like to remove, from the pressure waveform, a pressure changing component inherent in the engine such as compression pressure. Thus, as shown on the lower side in FIG. 6, a pressure waveform only including a pressure pulse due to the knock is extracted. Typically, in the pressure pulse of the pressure waveform, a maximum amplitude value is regarded as a knock intensity (Kp) (in bars) in the combustion cycle.

Figure 7:
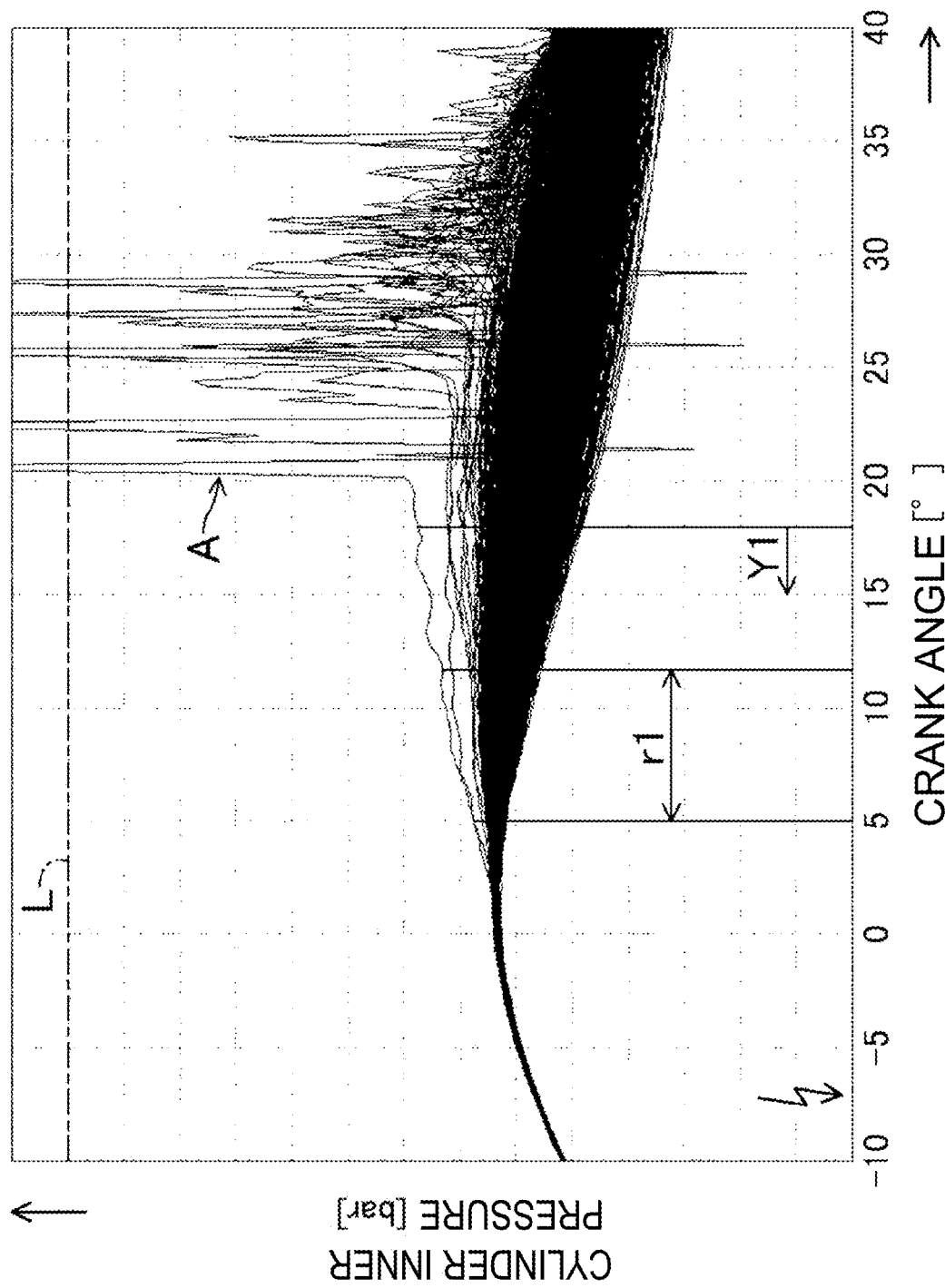
FIG. 7 is a graph showing a relationship between a cylinder inner pressure change and a crank angle during combustion in a plurality of combustion cycles.

The reference value SV is a value of cylinder inner pressure at a predetermined timing in the initial stage of combustion before the intense knock occurs (specifically, during the process of the combustion from immediately after the start of the combustion of the air-fuel mixture to subsequent occurrence of the knock), and previously obtained by an experiment or the like. One or more reference values SV may be set. The reference value SV may be set according to the conditions of combustion. With reference to FIG. 7, an example thereof will be described.

The graph in FIG. 7 shows the cylinder inner pressure on the Y axis and the crank angle on the X axis during combustion under a predetermined combustion condition. The predetermined combustion condition corresponds to a case where the engine 1 is operated at a rotational speed of 4000 rpm in the high rotational speed range (5) (this will be described below as the combustion in the engine 1). FIG. 7 shows cylinder inner pressure in many combustion cycles performed under the same combustion condition such as the same fuel injection amount or injection timing or the same ignition timing in a superimposed manner.

Under the combustion condition, the injection of fuel is performed at a predetermined timing in the intake stroke, and the ignition by the ignition plug 25 is performed at a timing of a crank angle of around 7° before the compression top dead center (also referred to as −7° CA (Crank Angle)). Thus, the cylinder inner pressure gradually increases toward the compression top dead center, and the combustion by the ignition is started near the compression top dead center (0° CA). When the expansion stroke is entered after the compression top dead center, the combustion by flame propagation progresses with decreasing cylinder inner pressure caused by the piston 3 moving down. The combustion heat and combustion pressure cause self-ignition in part of the combustion cycles, and many pressure pulses representing a knock occur at and after 20° CA.

Among the pressure pulses, some pulses have abnormally high peaks. For example, when a knock representing a pressure pulse higher than the reference line L in FIG. 7 is an intense knock with a predetermined knock intensity or higher, the frequency of occurrence of the intense knock is a few times per 1000 combustion cycles.

In the combustion with occurrence of the intense knock, the present inventors have determined that the cylinder inner pressure in the initial stage of the combustion tends to be relatively higher than in the combustion without occurrence of the intense knock. The present inventors have focused on this fact, and found that by comparing the cylinder inner pressure with the predetermined reference value SV at a proper timing in the initial stage of the combustion, whether or not the intense knock will subsequently occur can be determined.

For example, for the cylinder inner pressure change in the combustion with occurrence of the intense knock at the earliest timing (also referred to as intense knock combustion) as shown by arrow A in FIG. 7, the cylinder inner pressure is relatively high in an initial stage of combustion from immediately after the start of the combustion of the air-fuel mixture (in this example, a timing of a crank angle of a few degrees after the compression top dead center) to subsequent occurrence of the knock, and a pressure difference from the combustion without occurrence of the intense knock is found. Thus, setting a reference value SV that allows determination of the pressure difference, and comparing the cylinder inner pressure with the reference value SV in the initial stage of the combustion allows determination whether or not the intense knock subsequently occurs.

As described above, in this engine 1, the pressure sensor SW6 detects the cylinder inner pressure at an interval of 1° CA and outputs this detected cylinder inner pressure to the ECU 8. The ECU 8 includes the processor 8a that can perform a high-speed advanced arithmetic processing. Thus, at a predetermined timing in the initial stage of the combustion, the cylinder inner pressure detected by the pressure sensor SW6 can be compared with the reference value SV to predict the intense knock that may occur during the course of the combustion. For example, even when the engine 1 is operated at a high rotational speed, for example higher than 5000 rpm, the intense knock can be predicted.

The timing suitable for determining whether or not the cylinder inner pressure exceeds the reference value SV (determination timing) varies according to the combustion conditions. Thus, the determination timing is preferably set within a period corresponding to the combustion conditions under which the intense knock tends to occur. Specifically, the determination timing is preferably set within a period in which a crank angle is between 15° before the top dead center (−15° CA) and 25° after the top dead center (25° CA).

As described above, the intense knock tends to occur when the engine is operated in a high load and high rotation operating range. Under the combustion conditions in such an operating range, the initial stage of combustion is often within a period from −15° CA to 25° CA. Thus, setting the determination timing within this period allows efficient and stable prediction of an intense knock.

In terms of knock suppression, a knock suppression processing is performed during the process of combustion before the actual occurrence of an intense knock. Thus, the determination timing is set to an early timing when occurrence of an intense knock can be determined in the initial stage of the combustion.

For example, under the combustion condition in FIG. 7, the determination timing is preferably set within a period from 5° CA to 13° CA (r1 in FIG. 7). In this engine 1, 9° CA is set as the determination timing under the illustrated combustion condition.

The cylinder inner pressure used for comparison with the reference value SV may be a detected value of cylinder inner pressure obtained from the detected signal from the pressure sensor SW6, or a value obtained by calculating a plurality of detected values of cylinder inner pressure. One or more determination timings for detecting the cylinder inner pressure may be set. For a plurality of determination timings, a reference value SV may be set for each determination timing, the reference values SV may be compared with corresponding values of the cylinder inner pressure, and a comprehensive determination may be made. Information on such cylinder inner pressure is obtained by the knock information obtaining unit 81.

Further, the determination timing is preferably set based on the burned mass fraction (BMF), and is preferably set within a period in which the burned mass fraction is between 5% and 20% in terms of knock suppression. The burned mass fraction is explained in detail below.

The combustion period is advanced or retarded depending on the combustion conditions. Accordingly, an optimum determination timing also changes. Thus, when the determination timing is set based on the crank angle, the determination timing may be shifted from a previous optimum timing as the combustion conditions change as the determination timing is fixed to the crank angle and may not always reflect the actual combustion conditions. On the other hand, when the determination timing is set based on the burned mass fraction, the determination timing appropriately changes with changing combustion conditions, and thus the optimum timing can be maintained.

The "burned mass fraction" is an index representing a progress of combustion used in this technical field. The burned mass fraction approximately corresponds to a fraction (%) of burned fuel mass to total fuel mass. The burned mass fraction may be a fraction of burned fuel mass B to mass A of fuel supplied into the combustion chamber 17 per one combustion cycle (B/A; in %). The burned mass fraction may be a fraction of an amount of heat generation D that has occurred before a target point to a total amount of heat generation C that occurs when all the fuel supplied into the combustion chamber 17 is burned (D/C; in %).

The burned mass fraction can be calculated from the history of the cylinder inner pressure after the start of combustion. In this engine 1, the knock intensity determination unit 82 calculates the burned mass fraction based on the history of the cylinder inner pressure immediately after the start of the combustion, and performs a determination timing judgement processing (determination timing judgement step) for judging the determination timing based on the burned mass fraction.

Figure 8:
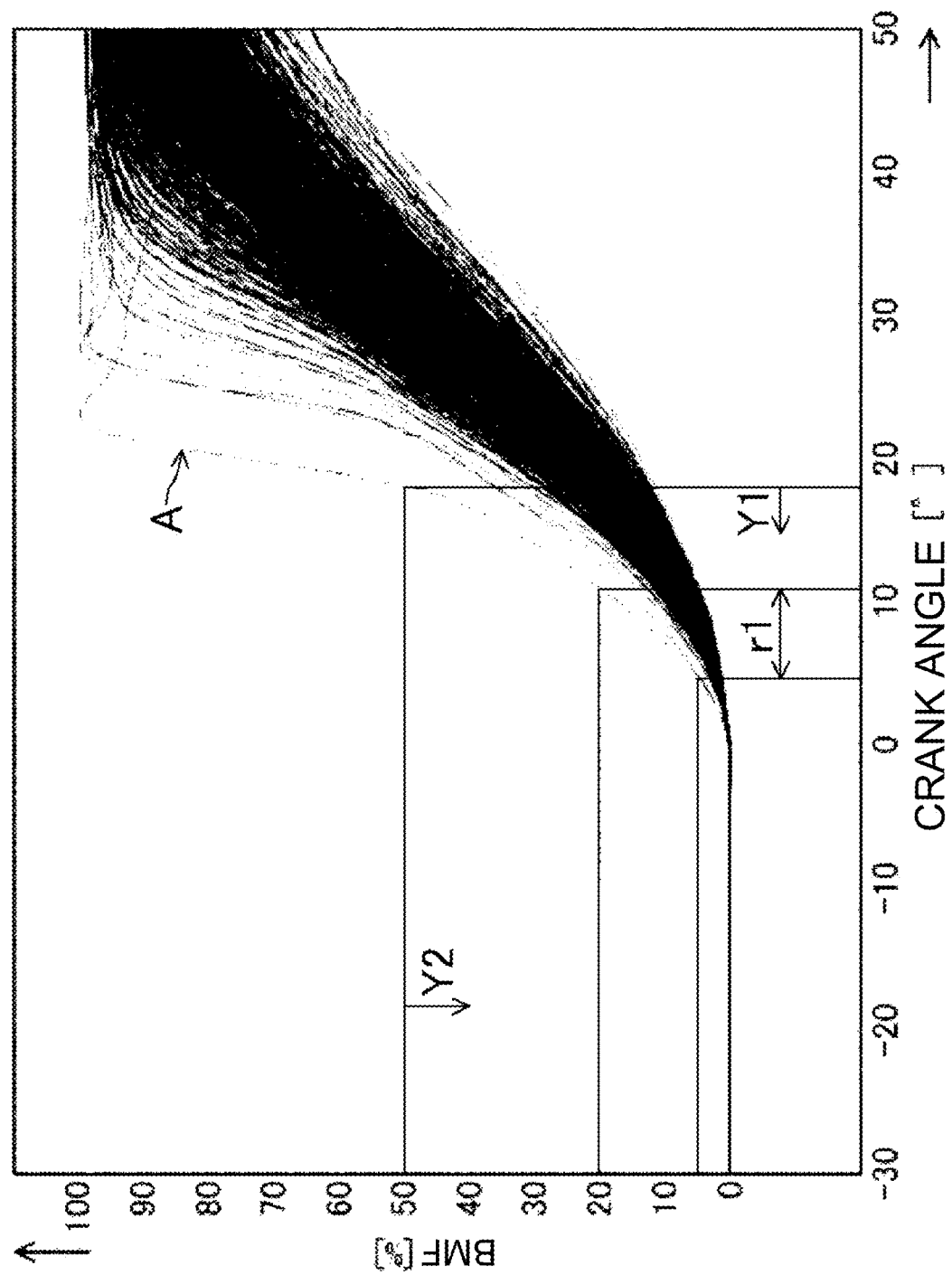
FIG. 8 is a graph showing a relationship between a burned mass fraction and a crank angle during each combustion in FIG. 7.

FIG. 8 shows a graph of the burned mass fraction corresponding to FIG. 7. In the illustrated combustion condition, the burned mass fraction before and near 0° CA at which the combustion starts is 0%. Then, the combustion progresses to increase the burned mass fraction, the combustion ends after around 20° CA, and the burned mass fraction reaches 100%.

In the intense knock combustion, the period r1 at 5° CA to 13° CA described above corresponds to the period in which the burned mass fraction is between 5% and 20%. In the intense knock combustion, 9° CA corresponds to the timing at the burned mass fraction of 10%.

Thus, in this engine 1, to predict and suppress the intense knock, the determination timing is set within the period in which the burned mass fraction is between 5% and 20%. Specifically, at the timing at the burned mass fraction of 10%, whether or not the intense knock occurs is determined.

<Suppression of Intense Knock>

As shown in FIG. 5, in this engine 1, when occurrence of the intense knock is predicted in the knock intensity determination processing 101, that is, when the cylinder inner pressure exceeds the reference value SV at the determination timing, the knock suppression processing 102 (knock suppression step) for suppressing the intense knock is performed. Specifically, before the end of the combustion, a fluid (additional fuel in this engine 1) is injected into the combustion chamber 17.

A series of processing steps for suppressing the intense knock following the processing for predicting of the intense knock described above is performed during one combustion period in the same combustion cycle. In this engine 1, the combustion starts at the timing around the compression top dead center, and ends during the expansion stroke. During the period from the start to end of the combustion, occurrence of the intense knock is predicted, and the fuel is additionally injected based on the prediction.

The engine 1 includes the injector 6 for injecting the fuel into the combustion chamber 17. The injector 6 can nearly instantly inject the fuel at high pressure. Thus, in this engine 1, when occurrence of the intense knock is predicted, the ECU 8 performs control so that the injector 6 additionally injects the fuel. Specifically, the knock suppression processing 102 is performed by the ECU 8.

When the fuel is injected into the combustion chamber 17 at high pressure, the air-fuel mixture under combustion is agitated. As described above, the knock is caused by an unburned air-fuel mixture being locally increased in temperature and pressure. Thus, when the air-fuel mixture is agitated during the combustion, the temperature of the entire air-fuel mixture is equalized to suppress the local temperature increase of the unburned air-fuel mixture, thereby suppressing the intense knock. The fuel can be injected using an existing injector 6. Cooling action due to vaporization of the fuel is also advantageously obtained.

The intense knock occurs after the compression top dead center during the combustion period. Thus, the fuel is preferably additionally injected after the compression top dead center (0° CA).

Also, as shown in FIG. 7, the earliest intense knock occurs is at the timing of 20° CA. Thus, to suppress the intense knock, the fuel needs to be additionally injected at least before 20° CA. Considering a time for an agitating effect to be given to the air-fuel mixture after the injection, the fuel is preferably additionally injected at least before 18° CA (see arrow Y1 in FIG. 7) to suppress the intense knock.

Referring to FIG. 8, 18° CA in the intense knock combustion corresponds to the burned mass fraction of 50%. Thus, the fuel is preferably additionally injected within a period after the start of the combustion and before the burned mass fraction reaches 50% (see arrow Y2 in FIG. 8).

On the other hand, to efficiently suppress the knock, agitation is preferably performed immediately before occurrence of the knock. If the agitation is performed in a state where the temperature of the unburned air-fuel mixture is not locally sufficiently increased, a high temperature suppression effect cannot be obtained. A temperature suppression effect by the agitation is higher in a state where the temperature of the unburned air-fuel mixture is locally sufficiently increased because of a larger temperature difference of the air-fuel mixture. Thus, injecting the fuel immediately before occurrence of the knock allows more efficient suppression of the knock.

Figure 10:
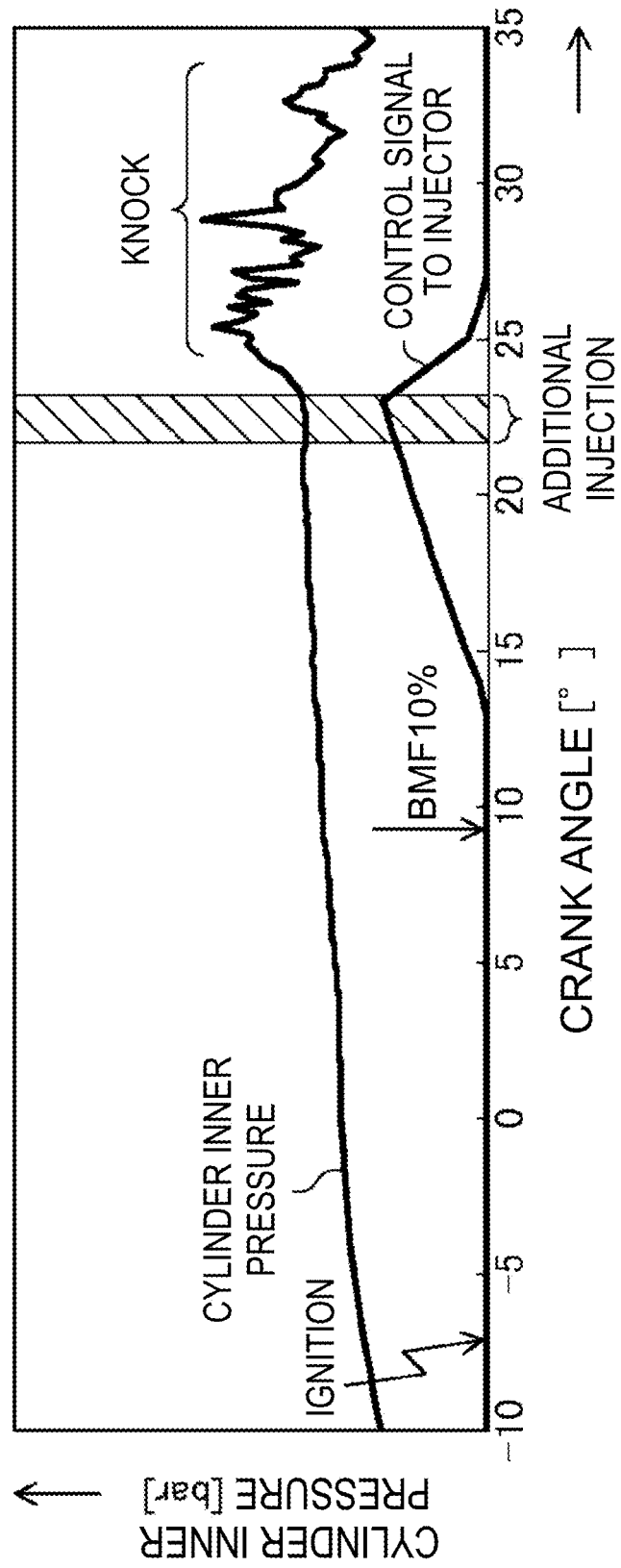
FIG. 10 illustrates a combustion state when the intense knock prediction and suppression are controlled.

Even if a control signal to additionally inject the fuel is output to the injector 6, it takes a certain time before the injector 6 actually injects the fuel (see FIG. 10). Thus, a certain time needs to be ensured between the determination timing and the additional fuel injection.

Thus, the fuel is preferably additionally injected within a period in which the burned mass fraction is between 20% and 50%, and more preferably, within a period in which the burned mass fraction is between 30% and 50%.

In terms of knock suppression, the fuel may be additionally injected in all the combustion cycles to suppress the intense knock. However, the fuel used for additional injection is different from the fuel required for operating the engine 1, and additional fuel injection in all the combustion cycles disadvantageously increases fuel consumption. Also, such additional fuel injection increases soot. Thus, in view of the increase in fuel consumption which also results in higher exhaust noise, additional fuel injection in all the combustion cycles is unpreferable.

In this engine 1, the fuel is additionally injected only when the intense knock is predicted. This can minimize the frequency of the additional fuel injection, and effectively suppress the intense knock.

To suppress the knock, it is effective to additionally inject a larger amount of fuel. However, additionally injecting a larger amount of fuel increases soot accordingly. Also, since the processing steps from the prediction to the additional injection are performed in the same combustion cycle, the time for the fuel injection is short. Thus, in view of these points, the mass of the fuel additionally injected is preferably set to 10% or less of the total mass of the fuel injected in the combustion cycle in which the fuel is additionally injected (total mass of injected fuel). A more preferable range of fuel additionally injected is 3% to 7%, and even more preferable range of fuel additionally injected is 4% to 6%. The injector 6 can achieve a required agitating effect of the air-fuel mixture even with such an injection amount. In this engine 1, the mass of the fuel additionally injected is even furthermore preferably set to 5% of the total mass of injected fuel, although any amount of additional fuel described herein may be injected.

<Example of Prediction Control and Suppression Control of Intense Knock>

Figure 9:
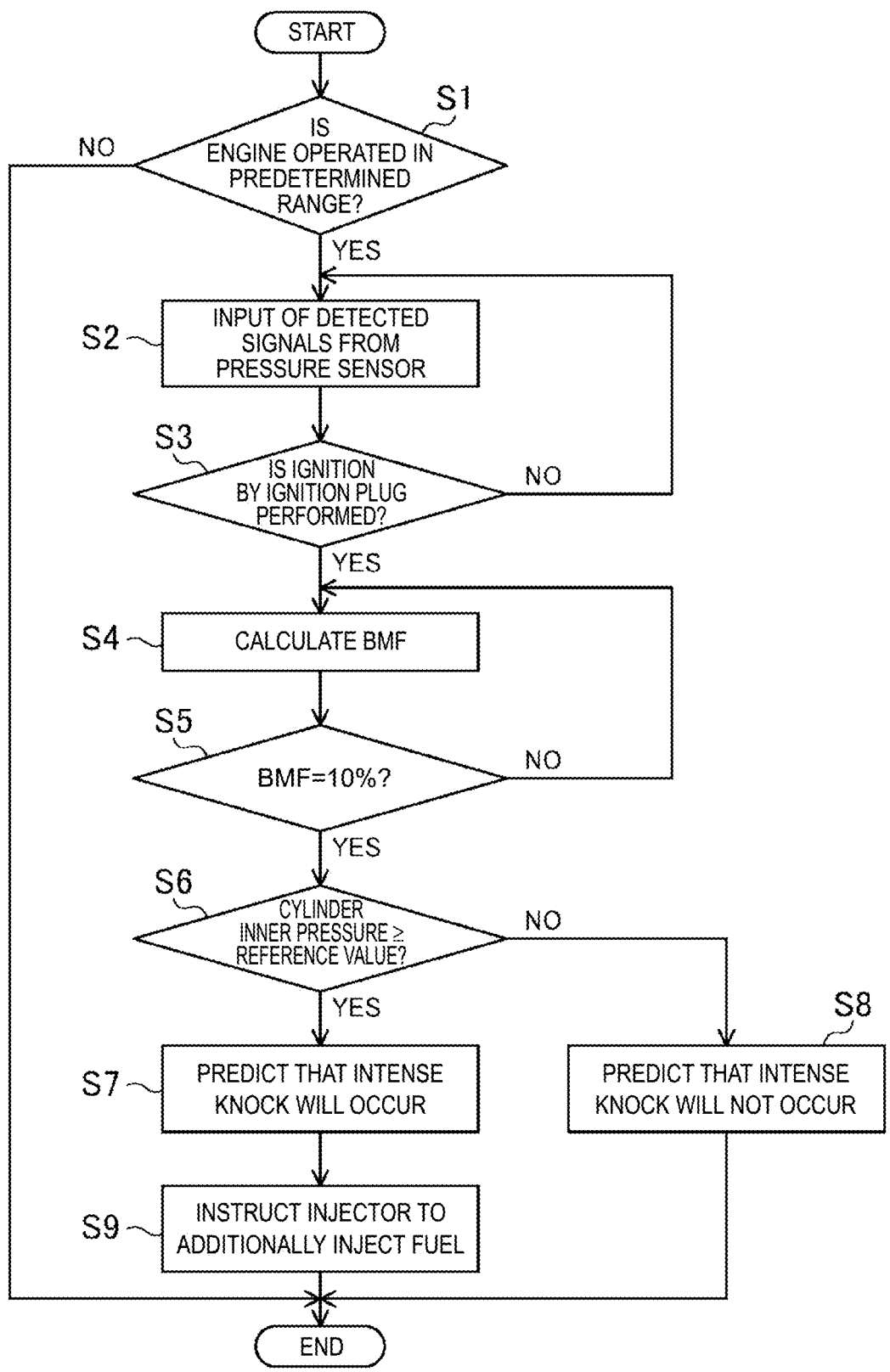
FIG. 9 is an exemplary flowchart of control of intense knock prediction and suppression.

FIGS. 9 and 10 show an example of prediction control and suppression control of an intense knock performed in this engine 1.

As described above, the intense knock tends to occur when the engine is operated at high rotational speed in the high load range. Thus, as shown by chain line E in FIG. 3, the engine 1 is configured so that the prediction control and suppression control of the intense knock are performed in a predetermined range (target range) from the high load medium rotational speed range (3) for SPCCI combustion to the high load range in the high rotational speed range (5) for SI combustion.

Although the prediction control and suppression control of the intense knock may be performed in the entire operating range, performing the prediction control and suppression control only in the partial target range in which the intense knock may occur can efficiently suppress the intense knock and reduce a processing load on the ECU 8.

Thus, the ECU 8 (specifically, the knock occurrence prediction program 80) determines whether or not the engine 1 is operated in the target range based on the detected signals input from the crank angle sensor SW11, the accelerator opening sensor SW12, or the like during the operation of the engine 1 (step S1). When the engine 1 is operated in the target range, the ECU 8 continuously receives the detected signal from the pressure sensor SW6 to predict and suppress the intense knock (step S2). Here, a description is made on the assumption that the engine 1 is operated in the high load range in the high rotational speed range (5) in FIG. 3 as the target range.

The knock information obtaining unit 81 obtains the cylinder inner pressure from the detected signal as required. The cylinder inner pressure may be a value directly obtained from the input detected signal (so-called actual measurement) or an indirect value obtained by an arithmetical processing of the input detected signal.

Then, the ECU 8 determines whether or not ignition by the ignition plug 25 is performed (step S3). In the target range, the combustion is started by ignition by the ignition plug 25, and thus the ECU 8 detects an ignition timing for each combustion cycle. Then, when the ignition by the ignition plug 25 is performed, the knock intensity determination unit 82 calculates the burned mass fraction of the combustion started by the ignition based on the history of the pressure sensor SW6 (step S4).

As shown in FIG. 10, when the ignition is performed at the timing of −7° CA, the knock intensity determination unit 82 continuously calculates the burned mass fraction using the detected signal input from the crank angle sensor SW11 and the detected signal subsequently input from the pressure sensor SW6. When the burned mass fraction reaches 10% (Yes in step S5), the knock intensity determination unit 82 compares the cylinder inner pressure obtained by the knock information obtaining unit 81 with the reference value SV (step S6).

As a result, when the cylinder inner pressure is the reference value SV or higher, the knock intensity determination unit 82 predicts that the intense knock will occur (step S7). When the cylinder inner pressure is lower than the reference value SV, the knock intensity determination unit 82 predicts that the intense knock will not occur (step S8). When it is predicted that the intense knock will not occur, the ECU 8 finishes the intense knock prediction control and suppression control in that combustion cycle, and moves to intense knock prediction control and suppression control in the next combustion cycle.

On the other hand, when it is predicted that the intense knock will occur, the ECU 8 instructs the injector 6 to additionally inject fuel (step S9). Thus, a control signal to open the nozzle for a time corresponding to an amount of fuel additionally injected is output to the injector 6.

As shown in FIG. 10, there is a time lag (about 10° CA in this example) after the injector control signal begins to be output and before the additional fuel is actually injected. The ECU 8 outputs the control signal in view of the time lag. Thus, the fuel is additionally injected immediately before the knock occurs.

The additional fuel which has been injected suppresses the intense knock, and thus the knock is eliminated, or a knock with a low knock intensity occurs.

<Verification Test>

A test was conducted to verify an intense knock suppression effect by the injection of additional fuel. In the verification test, an engine similar to the engine 1 described above (having a geometric compression ratio of 17 or more) was used. Fuel was collectively injected in an intake stroke so that an operating state is the same as in a high load range, and the engine was operated at a rotational speed of 4000 rpm. During the operation of the engine, two combustion cycles were evaluated in which an intense knock was predicted to occur, and the cylinder inner pressure changes in combustions were compared with and without additional fuel injection.

Figure 11:
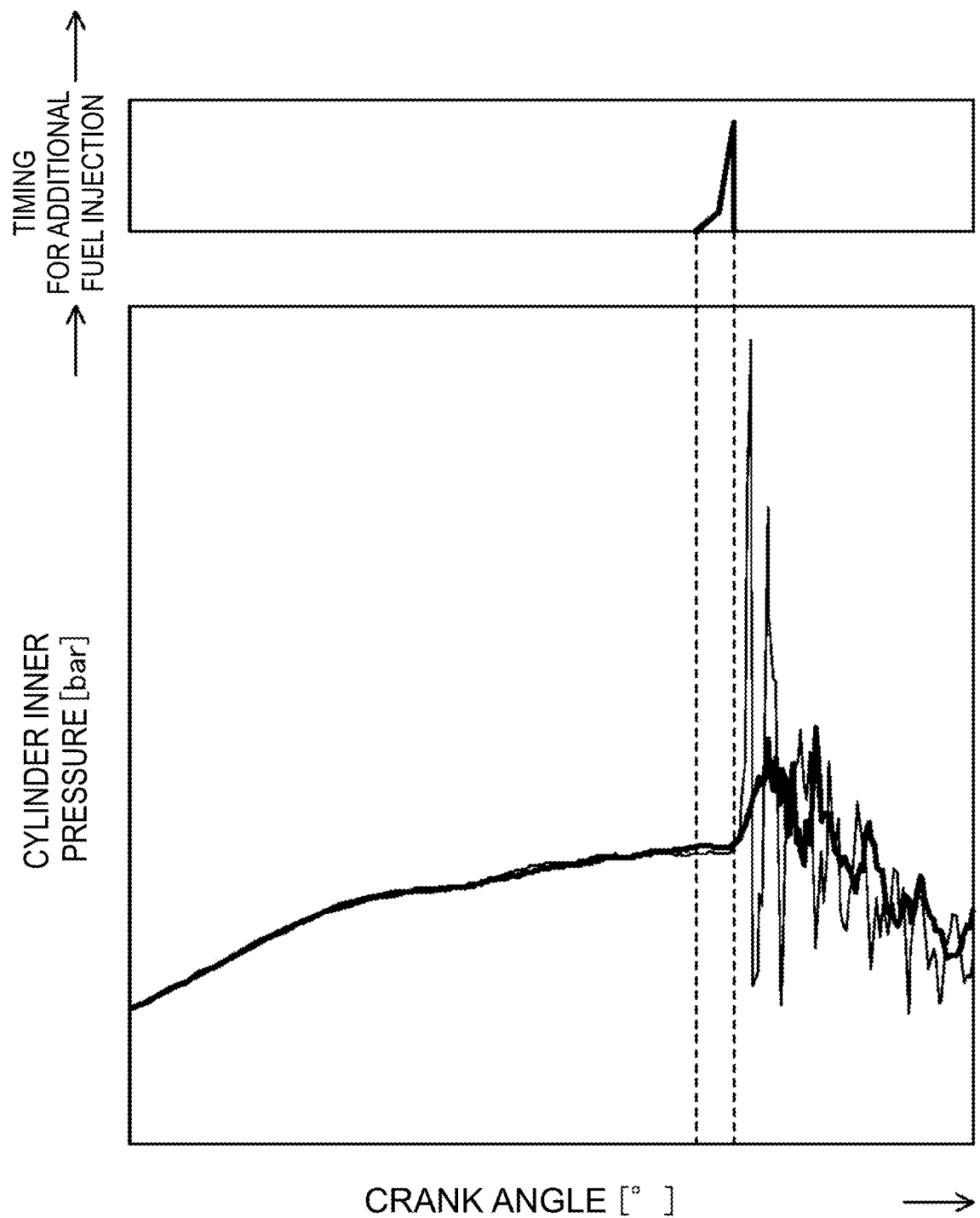
FIG. 11 is a graph showing a result of a verification test of the control of the intense knock prediction and suppression.

FIG. 11 shows the results of the verification test. The graph shown by the thin line represents the cylinder inner pressure change in the combustion without additional fuel injection (comparative example). The graph shown by the thick line represents the cylinder inner pressure change in the combustion with additional fuel injection (example). The fuel was additionally injected immediately before the knock occurs as shown in the upper part of FIG. 11. As is apparent from the graphs, when the fuel was not additionally injected, the intense knock occurred, and when the fuel was additionally injected, the knock intensity was low, and it was found that the intense knock was suppressed.

Thus, with the engine 1 to which the disclosed technique is applied, occurrence of an intense knock that does not occur frequently can be predicted with high precision, and the intense knock can be effectively suppressed, thereby improving reliability.

The disclosed technique is not limited to the embodiment described above, but encompasses various other configurations.

For example, a type of an engine to which the disclosed technique can be applied is not limited to that of the engine 1 of the embodiment. The disclosed technique can be applied to any engines in which a knock occurs. For example, the disclosed technique can be applied to a typical spark ignition engine or a compression self-ignition engine without spark ignition.

The cylinder inner pressure used for predicting the intense knock is not necessarily obtained by detection using the pressure sensor SW6. For example, the cylinder inner pressure may be indirectly estimated from data such as a combustion condition, and the estimated value may be used for determining the intense knock. Prediction and suppression of the intense knock may be performed in the entire operating range of the engine, not limited to a particular operating range.

The fluid to be additionally injected is preferably fuel, but is not limited to fuel. For example, water or gas may be injected. In short, any fluid may be used that can be injected to agitate the air-fuel mixture formed in the combustion chamber.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Obviously, numerous modifications and variations of the present invention are possible in light of the above teachings. It is therefore to be understood that within the scope of the appended claims, the invention may be practiced otherwise than as specifically described herein.

REFERENCE SIGNS LIST 1 engine
3 piston
6 injector
8 ECU
17 combustion chamber
25 ignition plug
80 knock occurrence prediction program (knock occurrence prediction means)
81 knock information obtaining unit
82 knock intensity determination unit
SV reference value

What is claimed is:
1. A method, comprising:
injecting, using an injector, fuel into a combustion chamber;
igniting a spark plug which begins an initial stage of combustion of an air-fuel mixture which includes the fuel in the combustion chamber, the initial stage of the combustion being from immediately after a start of the combustion of the air-fuel mixture by the spark plug to a subsequent occurrence of a knock, the igniting of the spark plug causing spark controlled compression ignition within the combustion chamber, an engine including the combustion chamber having a compression ratio of greater than 14;
obtaining, in the initial stage of combustion of the air-fuel mixture in the combustion chamber, a pressure in the combustion chamber;
comparing the pressure in the initial stage of combustion with a preset reference value and determining whether the pressure exceeds the reference value;
predicting, using processing circuitry, the knock will occur before an end of the combustion when the pressure exceeds the reference value; and
injecting, using the injector, a fluid into the combustion chamber before an end of the combustion in order to suppress the knock, when the knock is predicted to occur when the pressure exceeds the reference value.

2. The method according to claim 1, wherein:
the comparing is performed within a period in which a crank angle is between 15° before a top dead center of a piston in the combustion chamber and 25° after the top dead center.

3. The method according to claim 2, wherein:
the comparing is performed within a period in which a burned mass fraction is between 5% and 20% during the combustion.

4. The method according to claim 1, wherein:
the comparing is performed within a period in which a burned mass fraction is between 5% and 20% during the combustion.

5. The method according to claim 1, wherein:
the injecting of the fluid in order to suppress the knock is performed before a burned mass fraction reaches 50% during the combustion.

6. The method according to claim 1, wherein:
the obtaining obtains the pressure by detecting.

7. The method according to claim 1, wherein:
the obtaining obtains the pressure by estimating.

8. An engine system, comprising:
a combustion chamber including a cylinder;
a fuel supply including an injector that supplies fuel including gasoline into the combustion chamber;
a spark plug; and
circuitry configured to:
  inject, using the injector, fuel into the combustion chamber;
  ignite the spark plug which begins an initial stage of the combustion of an air-fuel mixture which includes the fuel in the combustion chamber, the initial stage of the combustion being from immediately after a start of the combustion of the air-fuel mixture by the spark plug to a subsequent occurrence of a knock, the igniting of the spark plug causing spark controlled compression ignition within the combustion chamber, an engine including the combustion chamber having a compression ratio of greater than 14;
  obtain, in the initial stage of combustion of an air-fuel mixture in the combustion chamber, a pressure in the combustion chamber;
  compare the pressure in the initial stage of combustion with a reference value and determine whether the pressure exceeds the reference value;
  predict the knock will occur before an end of the combustion when the pressure exceeds the reference value; and
  injecting, using the injector, a fluid into the combustion chamber before an end of the combustion in order to suppress the knock, when the knock is predicted to occur when the pressure exceeds the reference value.

9. The engine system according to claim 8, wherein:
the compare is performed within a period in which a crank angle is between 15° before a top dead center of a piston in the combustion chamber and 25° after the top dead center.

10. The engine system according to claim 8, wherein:
the compare is performed within a period in which a burned mass fraction is between 5% and 20% during the combustion.

11. The engine system according to claim 8, wherein the circuitry is further configured to:
inject the fluid in order to suppress the knock before a burned mass fraction reaches 50% during the combustion.

12. The engine system according to claim 8, wherein:
the obtaining obtains the pressure by detecting.

13. A non-transitory computer readable medium including instructions which, when executed by a processor, perform control of an engine system by executing the steps of:
injecting, using an injector, fuel into a combustion chamber;
igniting a spark plug which begins an initial stage of combustion of an air-fuel mixture which includes the fuel in the combustion chamber, the initial stage of the combustion being from immediately after a start of the combustion of the air-fuel mixture by the spark plug to a subsequent occurrence of a knock, the igniting of the spark plug causing spark controlled compression ignition within the combustion chamber, an engine including the combustion chamber having a compression ratio of greater than 14;
obtaining, in the initial stage of combustion of the air-fuel mixture in the combustion chamber, a pressure in the combustion chamber, wherein the initial stage of the combustion is during the process of the combustion from immediately after a start of the combustion of the air-fuel mixture to the subsequent occurrence of a knock;
comparing the pressure in the initial stage with a preset reference value and determining whether the pressure exceeds the reference value;
predicting the knock will occur before an end of the combustion when the pressure exceeds the reference value; and
injecting, using the injector, a fluid into the combustion chamber before an end of the combustion in order to suppress the knock, when the knock is predicted to occur when the pressure exceeds the reference value.

14. The method according to claim 3, wherein:
the burned mass fraction is calculated from a history of the pressure in the combustion chamber.

15. The method according to claim 1, wherein:
the initial stage of the combustion is from a latter stage of the compression stroke to an initial stage of the expansion stroke.

16. The engine system according to claim 8, wherein:
the initial stage of the combustion is from a latter stage of the compression stroke to an initial stage of the expansion stroke.

17. The method according to claim 1, further comprising:
determining whether the engine is operated in a target range based on the detected signals input from a crank angle sensor and an accelerator opening sensor,
wherein the target range is a high load range and a high rotational speed range.

18. The engine system according to claim 8, wherein the circuitry is further configured to:
determine whether an engine of the engine system is operated in a target range based on the detected signals input from a crank angle sensor and an accelerator opening sensor,
wherein the target range is a high load range and a high rotational speed range.

* * * * *